Figure 1:
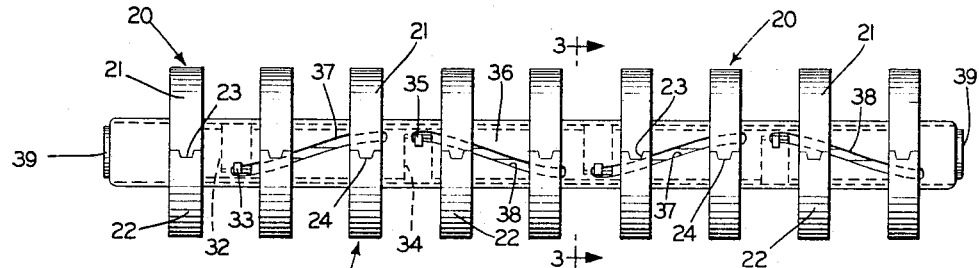

Oct. 25, 1966  W. W. DOUGHERTY  3,280,821
LOOSE LEAF BINDER CONSTRUCTION
Filed Oct. 5, 1964  3 Sheets-Sheet 1

INVENTOR.
Wayne W. Dougherty
BY
Frease, Bishop, Johns & Schick
ATTORNEYS

INVENTOR.
Wayne W. Dougherty
BY
Frease, Bishop, Johns & Schick
ATTORNEYS

Oct. 25, 1966 W. W. DOUGHERTY 3,280,821
LOOSE LEAF BINDER CONSTRUCTION
Filed Oct. 5, 1964 3 Sheets-Sheet 3

INVENTOR.
Wayne W. Dougherty
BY
Frease, Bishop, Johns & Schick
ATTORNEYS

United States Patent Office 3,280,821
Patented Oct. 25, 1966

3,280,821
LOOSE LEAF BINDER CONSTRUCTION
Wayne W. Dougherty, Canton, Ohio
(220 Seneca Trail, Hartville, Ohio)
Filed Oct. 5, 1964, Ser. No. 403,443
2 Claims. (Cl. 129—24)

This is a continuation-in-part of my copending application entitled Loose Leaf Binder Construction, Serial No. 279,093, filed May 9, 1963, now abandoned.

My invention relates generally to improvements in loose leaf binder construction, and more specifically to loose leaf binder construction in which the leaves or pages may be selectively removed or inserted as desired. Even more specifically, my invention relates to loose leaf binder construction of the foregoing type in which the leaves or pages mounted on the binder may be pivoted or moved about the binder nearly a complete 360 degrees.

Many prior forms of loose leaf binder constructions have been provided certain of which include a series of axially aligned split rings for receiving loose leaves or pages having appropriate apertures thereover. Furthermore these prior loose leaf binder constructions have been provided with various means for opening and closing the split rings in order that the loose leaves or pages may be conveniently inserted thereon or removed therefrom.

One of the principal difficulties with this form of prior loose leaf binder construction is that the means for opening and closing the split rings to provide the convenience of inserting the loose leaves or pages thereon and removing the same therefrom have necessarily, due to the particular constructions, enclosed a certain part of these split rings, thereby limiting the extent these loose pages may be moved on the rings and about the binder constructions. Thus, the movement of the loose pages relative to the split rings is limited to a movement in the order of approximately 240 degrees about these rings and it is impossible to pivot or move these loose pages completely back upon themselves, particularly where more than a few pages are involved, since this movement would require something close to a 360 degree movement about the rings.

This limitation of the prior binder constructions is not of great consequence where sufficient desk space is available for maintaining two of the loose pages retained by the binder in a side by side open position, since this still maintains the two side by side pages in a convenient flat writing position. In modern educational facilities however, this large flat desk area is frequently no longer provided, since individual desk type chairs are used merely having a broadened horizontally positioned single arm upon which the pages for writing must be positioned, so that the width of the desk area is only approximately the size of a single page.

Thus, with the use of the modern educational facilities, it is vital that a loose leaf binder construction be provided in which the loose leaves or pages may be pivoted or moved to positions completely overlying all of the other pages and this requires a movement about the split rings of the binders of nearly 360 degrees. For this reason, with the use of the prior binder constructions, it is necessary during writing to completely remove the leaves or pages from the binder with the consequent inconveniences and confusion.

To my knowledge, the only prior form of loose leaf binder construction provided in which the loose leaves or pages may be moved nearly 360 degrees about the various rings retaining these pages have been those in which the pages are retained by closed rings formed either of metal or plastic. In these prior constructions however, after the original manufacture, it is impossible to remove or insert any leaves or pages selectively on the binder.

It is, therefore, a general object of the present invention to provide a loose leaf binder construction which overcomes the difficulties and disadvantages of the prior constructions as discussed in the foregoing.

It is a primary object of the present invention to provide a loose leaf binder construction in which the loose leaves or pages may be conveniently and selectively removed therefrom or inserted thereon, yet while mounted on the split rings of the binder, the pages may be moved nearly a complete 360 degrees on these retaining rings.

It is a further object of the present invention to provide a loose leaf binder construction having split rings which may be selectively opened and closed for the removal and insertion of loose leaves or pages, yet virtually the entire operating mechanism for opening and closing the split rings is contained totally within the general confines of these split rings, thereby providing complete freedom of movement of the loose leaves or pages through nearly a full 360 degrees relative to the rings.

It is still a further object of the present invention to provide a loose leaf binder construction in which cam operating means may be formed for moving the split ringes thereof between open and closed positions, in one embodiment in the form of cam slot means and in another embodiment in the form of cam spring means.

Finally, it is an object of the present invention to provide a loose leaf binder construction which satisfies all of the foregoing objects in a simple and efficient manner and may be provided at a reasonable manufacturing cost.

These and other obejcts are accomplished by the parts, constructions, arrangements, combinations and sub combinations comprising the present invention, preferred embodiments of which—illustrative of the best modes in which applicant has contemplated applying the principles—are set forth in the following description and illustrated in the accompanying drawings, and which are particularly and distinctly pointed out and set forth in the appended claims forming a part hereof.

In general terms, the loose leaf binder construction comprising the present invention may be stated as including a series of axially aligned split rings, with each ring having preferably arcuate substantially semi-circular upper and lower ring portions and with the forward ends of each set of upper and lower ring portions abutting in closed position and being spaced apart in open position. Further, the rearward ends of the upper and lower ring portions of each ring are pivotally connected along a common pivot line means, whereby loose leaves or pages retained on the series of split rings may be moved from the upper side of the pivot line means completely around the rings, nearly 360 degrees, to the under side of the pivot line means.

Still further, the binder construction includes operating means for moving the series of split rings simultaneously between open and closed positions, with this operating means being operably connected to the split ring upper and lower ring portions for pivoting these ring portions about the pivot line means between said open and closed positions and with this operating means extending in a general axial manner substantially totally within the general axially defined confines of the series of split rings and spaced inwardly from said upper and lower ring portions. This operating means preferably includes operating arm means connected to the upper ring portions of each of the split rings and operating arm means connected to each of the lower ring portions of the split rings with such operating arm means preferably being connected to these upper and lower ring portions at the rearward ends thereof and extending generally horizontally within the confines of the split rings.

In one form, the ring portion rearward ends are pivotally connected directly to common pivot pin means and the inner ends of these operating arm means extend inwardly and are operably connected through cam slot means to a common generally axial or lengthwise slidable operating bar within said ring portions, which operating bar when moved in one direction, will move the split rings through the cam slot connection from closed to open position and when moved in the opposite lengthwise direction, will move the split rings through the cam slots from open to closed positions. In another form, the ring portion rearward ends are again pivotally connected directly to a common pivot pin means and the inner ends of these operating arm means extend inwardly and are operably connected through pivotal connections to a series of common cam spring means within said ring portions, whereby, an urging of the split rings from closed position toward open position will cause the cam spring means to pivot relative to the operating arm means and retain the split rings in open position, and an urging of the split rings from open toward closed position will cause the spring cam means to pivot and resiliently retain the split rings in closed position.

In still a third form, the ring portion rearward ends are offset axially, and when the ring portions are in closed position, these ring portion rearward ends are substantially axially adjacent with the operating arm means extending inwardly within said ring portions substantially axially adjacent. Furthermore, in this third form, the inner ends of the operating arm means within the ring portions are rigidly connected to flat axially extending pivot plates, which pivot plates have adjacent axially extending side edges abutting and spaced apart free edges. Resilient control means is telescoped over the pivot plate free edges resiliently urging the pivot plate abutting edges toward said abutting relationship.

The rigid connection between the ring portion operating arm means and the pivot plates is such that when the ring portions are in closed position, the pivot plates have a generally V-shaped cross sectional configuration, and when the ring portions are in open position, said pivot plates have an inverted generally V-shaped cross sectional configuration. Finally, the resilient control means is formed with stop means limiting the pivot plates in movement into said inverted V-shaped cross sectional configuration, thereby limiting the movement of the ring portions to open position.

Figure 2:
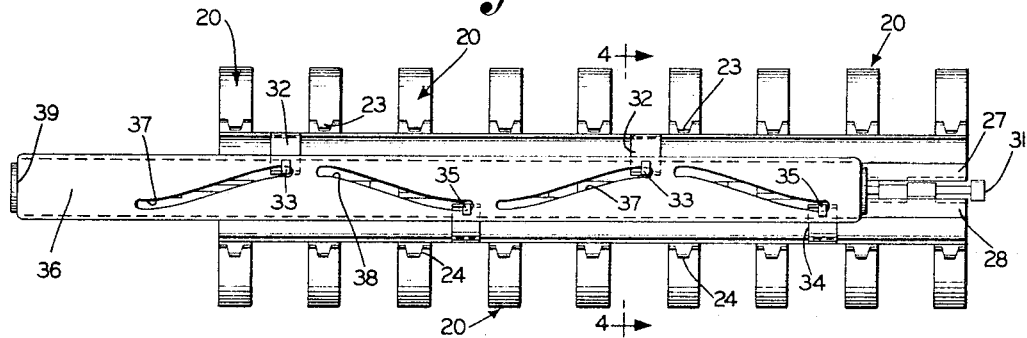
Figure 3:
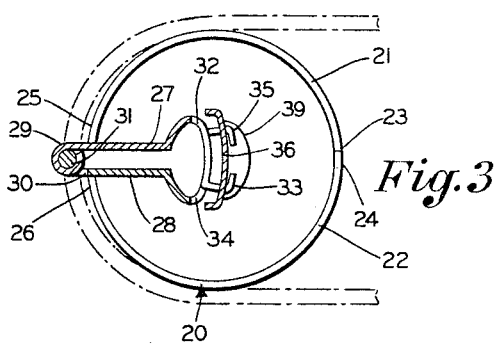
Figure 4:
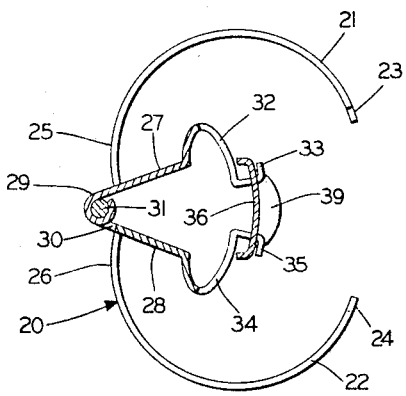
Figure 5:
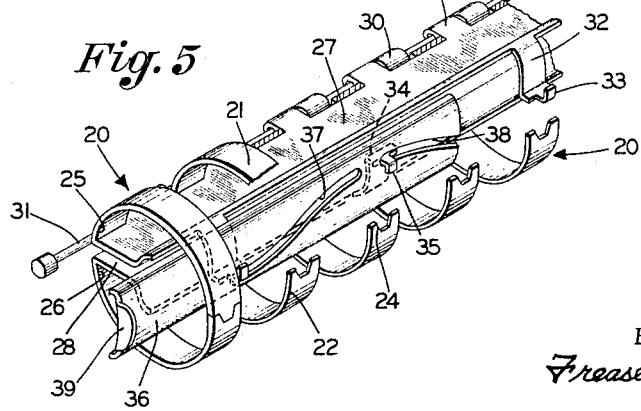
Figure 6:
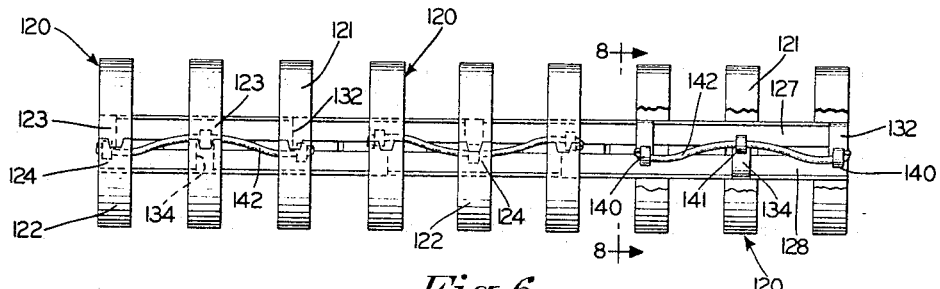
Figure 7:
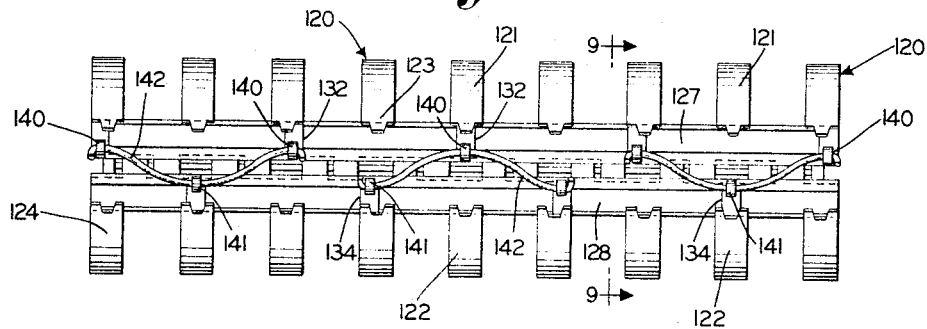
Figure 8:
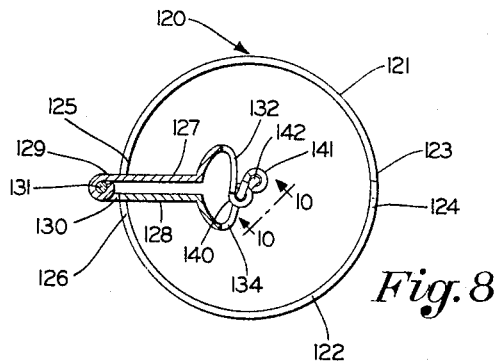
Figure 9:
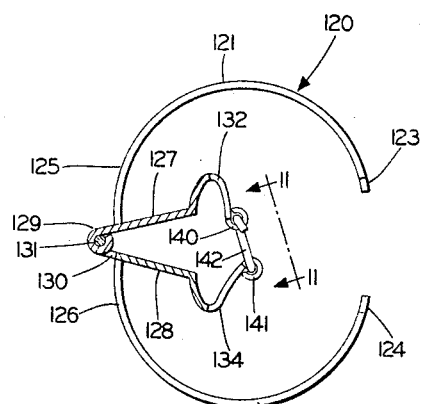
Figure 10:
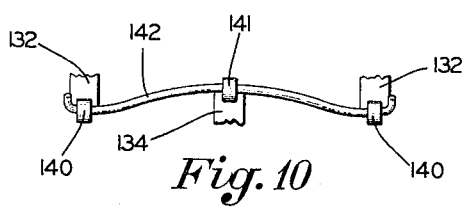
Figure 11:
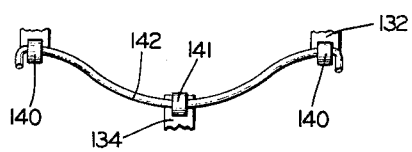
Figure 12:
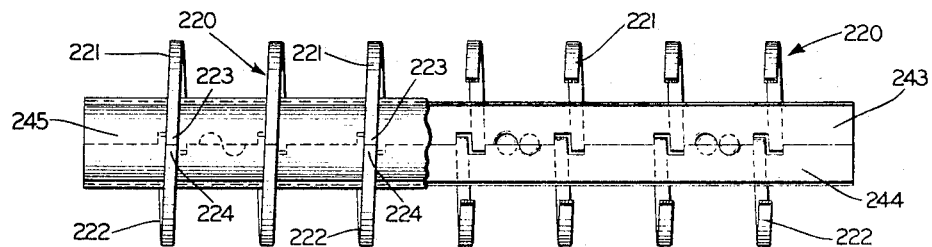
Figure 13:
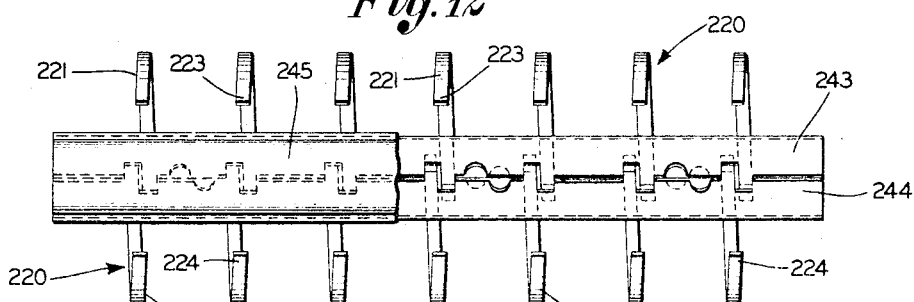
Figure 14:
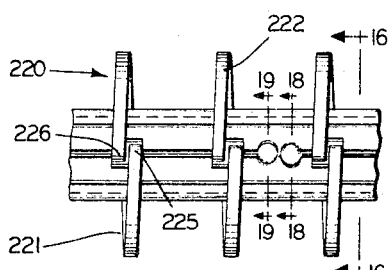
Figure 15:
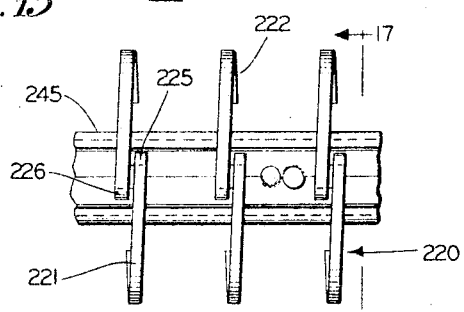
Figures 16, 17:
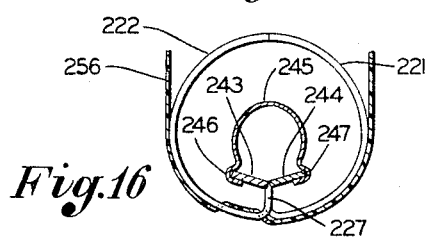
Figure 18:
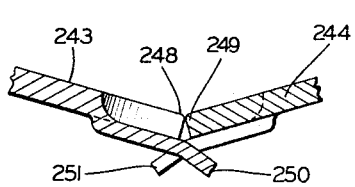
Figure 19:
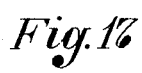

By way of example, embodiments of the loose leaf binder construction of the present invention are illustrated in the accompanying drawings forming a part hereof, wherein like numerals indicate similar parts throughout the several views, and in which:

FIG. 1 is a front elevation of one embodiment of the loose leaf binder construction in closed position;

FIG. 2, a view similar to FIG. 1 but with the binder construction in open position;

FIG. 3, an enlarged sectional view, part in elevation, looking in the direction of the arrows 3—3 in FIG. 1;

FIG. 4, a view similar to FIG. 3, but looking in the direction of the arrows 4—4 in FIG. 2;

FIG. 5, a fragmentary perspective view, with parts broken away and parts in section, illustrating certain of the internal construction of the binder construction of FIGS. 1 through 4;

FIG. 6, a front elevation of a second embodiment of the loose leaf binder construction of the present invention with the binder construction in closed position and with portions of certain split rings being broken away to show more clearly certain parts of the operating means of the construction;

FIG. 7, a view similar to FIG. 6, but showing the binder construction in open position;

FIG. 8, an enlarged sectional view, part in elevation, looking in the direction of the arrows 8—8 in FIG. 6;

FIG. 9, a view similar to FIG. 8, but looking in the direction of the arrows 9—9 in FIG. 7;

FIG. 10, a fragmentary view looking in the direction of the arrows 10—10 in FIG. 8;

FIG. 11, a view similar to FIG. 10, but looking in the direction of the arrows 11—11 in FIG. 9;

FIG. 12, a front elevation of a third embodiment of the loose leaf binder construction of the present invention with the binder construction in closed position and with portions of the resilient control means broken away to show more clearly the edge abutting pivot plates;

FIG. 13, a view similar to FIG. 12, but showing the binder construction in open position;

FIG. 14, a fragmentary bottom plan view of the binder construction of FIG. 12 in closed position;

FIG. 15, a view similar to FIG. 14 but showing the binder construction in open position;

FIG. 16, an enlarged sectional view, with distant parts removed and part in elevation, looking in the direction of the arrows 16—16 in FIG. 14;

FIG. 17, a view similar to FIG. 16, but looking in the direction of the arrows 17—17 in FIG. 15;

FIG. 18, an enlarged fragmentary sectional view, part in elevation, looking in the direction of the arrows 18—18 in FIG. 14; and FIG. 19, a view similar to FIG. 18, but looking in the direction of the arrows 19—19 in FIG. 14.

The first embodiment of the loose leaf binder construction comprising the present invention is illustrated in FIGS. 1 through 5 and includes a series of axially spaced and axially aligned, generally circular, split binder rings 20, each of which is formed from an arcuate or semi-circular upper ring portion 21 and lower ring portion 22. The forward ends 23 and 24 of the upper and lower ring portions 21 and 22, respectively, are positioned abutting when the binder rings 20 are in closed position, as shown in FIGS. 1, 3 and 5, and are spaced apart when the binder rings are in open position, as shown in FIGS. 2 and 4. Furthermore, these forward ends 23 and 24 may be formed interfitting, for instance as shown, so as not to present a straight line of separation when the binder rings 20 are in closed position for the usual purpose of more securely retaining the usual loose leaves or pages (not shown) on the binder construction when the binder rings are in such closed position.

The respective rearward ends 25 and 26 of the upper and lower ring portions 21 and 22 are each secured to the respective operating plates or arms 27 and 28 immediately forward of the respective rearward ends 29 and 30 of these operating arms 27 and 28. Thus, the rearward ends 25 of the upper ring portions 21 are connected to the operating arm 27 and the rearward ends 26 of the lower ring portions 22 are conneceted to the operating arm 28. Further, the rearward ends 29 and 30 of these operating arms 27 and 28 are pivotally connected by being wrapped around a common pivot pin 31, as best seen in FIGS 3, 4 and 5, so that, by virtue of the operating arms 27 and 28, the upper and lower ring portions 21 and 22 are pivotally connected for pivotal movement between closed positions in which loose leaves or pages will be retained thereon and open positions in which the loose leaves or pages may be selectively removed therefrom.

As shown in FIGS. 3 and 5, it is preferred to form all of the upper ring portions 21 and the operating arm 27 of one continuous piece of metal, and to similarly form the lower ring portions 22 and operating arm 28 of a second piece of metal. In this manner, the various upper ring portions 21 are spaced axially or lengthwise apart while the operating arm 27 extends continuously for the entire axial length of the binder construction and the lower ring portions 22 and operating arm 28 are similarly formed, thereby providing the pivotal split binder rings 20 when the pivotal connection is made by the pivot pin 31, as previously described.

The operating arm 27 if spaced above the operating arm 28 and extends generally horizontally inwardly within the general confines of the binder rings 20, where this operating arm 27 is formed extending arcuately upwardly, terminating in a series of axially spaced arcuately downwardly extending operating tabs 32. Operating tabs 32 extend arcuately downwardly and then inwardly, where these tabs terminate in the generally L-shaped cam engaging portions 33.

The operating arm 28 is positioned spaced below the operating arm 27 and is similarly but oppositely formed to the operating arm 27. Thus, the operating arm 28 extends generally horizontally inwardly, then arcuately downwardly, terminates in the arcuately upwardly extending and axially spaced operating tabs 34, which terminate inwardly in the inverted generally L-shaped cam engaging portions 35. Each of the operating tabs 32 is preferably equally spaced from an operating tab 34 so as to provide equally spaced alternate downwardly extending operating tabs 32 and upwardly extending operating tabs 34 with their respective cam engaging portions 33 and 35, as shown in FIGS 1, 2 and 5.

An operating slide 36 which extends the entire axial length of the operating arms 27 and 28 and projects a distance end-wise from the operating arms and in either direction is slidably mounted engaged with the operating tabs 32 and 34 of the operating arms 27 and 28. This slidable connection is accomplished by the operating tabs 32 of operating arm 27 each being engaged in a generally axially extending cam slot 37 formed in the operating slide 36, and the operating tabs 34 of operating arm 28 each being engaged in a generally axially extending cam slot 38 formed in the operating slide 36, with the L-shaped configurations of these operating tabs 32 and 34 preventing separation of the operating slide 36 from these tabs while still maintaining this slide axially slidable relative to the operating arms 27 and 28, as determined by the axial extension of the cam slots 37 and 38.

Using the left-hand end of the binder construction as a reference point, the cam slots 37, which control the movement of the operating arm 27 through the operating tabs 32, curve arcuately upwardly in their axial extension along the operating slide 36 from left to right, whereas the cam slots 38 curve similarly arcuately downwardly. Thus, when the binder rings 20 are in closed position, as shown in FIG. 1, the cam engaging portions 33 of operating arm 27 are in the lower portions of the cam slot 37 and the cam engaging portions 35 of the operating arm 28 are in the upper portions of the cam slot 38, with, in both cases, the particular cam engaging portions being at the left-hand ends of their respective cam slots.

Furthermore, when the operating slide 36 is moved slidably from right to left, from the position shown in FIG. 1 to the position shown in FIG. 2, the cam engaging portions 33 of operating arm 27 will move upwardly in the cam slots 37, thereby pivoting the upper ring portions 21 upwardly, while at the same time, the cam engaging portions 35 of the operating arm 28 will be moved downwardly by the cam slots 38, to thereby move the lower ring portions 22 downwardly and position the binder rings 20 in open position, as shown in FIGS. 2 and 4. Returning the operating slide 36 slidable to its right-hand position, as shown in FIG. 1, will, of course, reverse the previously described action and cause the cam slots 37 and 38, acting through operating tabs 32 and 34, to again return the upper and lower ring portions 21 and 22 to closed positions.

For convenience in axial or endwise movement of the operating slide 36, a finger tab 39 may be provided at either end thereof as shown. Also, as shown in broken lines in FIG. 3, a flexible cover formed of plastic, rubber or other suitable flexible materials may be positioned around the binder rings 20 connected to the pivot pin 31 in any suitable fashion.

Thus, a loose leaf binder construction is provided in which the loose leaves or pages have complete freedom of movement on the binder rings 20 for nearly a total of 360 degrees and this is accomplished by providing the actuating or operating means for movement of these split binder rings 20 between open and closed positions substantially totally with the general axially defined confines of these binder rings. Also, a cam actuating or operating means is provided for positively moving the split binder rings 20 between their open and closed positions.

The second embodiment of the loose leaf binder construction comprising the present invention is illustrated in FIGS. 6 through 11, and in this second embodiment form, the binder rings 120 are similarly formed with the upper and lower ring portions 121 and 122, with these ring portions having the abutting forward ends 123 and 124 and the pivotally connected rearward ends 125 and 126, which are pivotally connected through the operating arms 127 and 128 by the pivot pin 131. Furthermore, the operating arms 127 and 128 are similarly formed extending generally horizontally inwardly and then arcuately upwardly and downwardly, respectively, with the appropriate operating tabs 132 and 134, tabs 132 extending arcuately downwardly and tabs 134 extending arcuately upwardly.

In this second embodiment construction, however the operating tabs 132 of the operating arm 127 terminates in the ring portions 140, while the operating tabs 134 of the operating arm 128 terminate in the ring portions 141. A series of normally generally U-shaped operating springs 142 are pivotally engaged through various of the operating arm ring portions 140 and 141 to provide a cam control of the binder rings 120 for movement of these binder rings between resiliently urged closed positions and open positions, as shown in FIGS. 6 and 7, respectively.

Beginning from the left-hand end of the binder construction as shown in FIGS. 6 and 7, the first or left-hand operating spring 142 is pivotally engaged at the two end portions thereof with the spaced ring portions 140 of the operating arm 127, and this left-hand spring is pivotally engaged centrally with one of the ring portions 141 of the operating arm 128. The intermediate operating spring 142 is pivotally engaged at its two ends with spaced ring portions 141 of the operating arm 128 and centrally with one of the ring portions 140 of the operating arm 127. Finally, the right-hand operating spring 142 is pivotally engaged at its two ends with spaced ring portions 140 of operating arm 127 and centrally with a ring portion 141 of operating arm 128.

Furthermore, when the binder rings 120 are in closed position, as shown in FIGS. 6, 8 and 10, with the forward ends 123 and 124 of the upper and lower ring portions 121 and 122 abutting, the ring portions 140 of the operating arm 127 are at a level only slightly below the ring portions 141 of the operating arm 128 so that all three of the operating springs 142 are in relatively flat positions, resiliently urging the ring portions 140 of operating arms 127 downwardly and the ring portions 141 of operating arms 128 upwardly, thereby urging the binder rings 120 toward closed positions and resiliently retaining these binder rings in such closed positions.

When, however, the binder rings 120 are moved toward open position as shown in FIGS. 7, 9 and 11, which may be accomplished merely by grasping the upper and lower ring portions 121 and 122 of one of the binder rings 120 and urging this particular ring toward its open position, the operating springs 142 first compress slightly further to a more flattened condition until the ring portions 140 of operating arm 127 begin to move above the ring portions 141 of the operating arm 128, at which time the operating springs 142 pivot within the ring portions 140 and 141 from the positions shown generally in FIGS. 6, 8 and 10 toward the positions shown generally in FIGS. 7, 9 and 11. After such pivoting, these operating springs 142 now resiliently urge the ring portions 140 of operating arm 127 upwardly and ring poritons 141 of operating arm 128 downwardly, thereby resiliently urging the binder rings 120 toward and to open position, as shown in FIGS. 7, 9 and 11.

When the binder rings 120 are in fully open position, these operating springs 142 are in a free standing and more fully U-shaped position. A direct comparison of the shapes of these operating springs 142 may be seen in FIGS. 10 and 11, which is an illustration of the right-hand-most springs, and in FIG. 10 shows the condition of the spring when the binder rings 120 are in closed position, and in FIG. 11 when the binder rings are in open position. Also, the pivotal movement of these springs is readily apparent from comparing FIGS. 8 and 9, as well as FIGS. 10 and 11.

Thus, in this second embodiment construction, a loose leaf binder construction having the same full freedom of movement of loose leaves or pages retained on the binder rings 120 is provided, that is, a full freedom of movement through nearly 360 degrees. Furthermore, another cam actuating or operating means is provided, in this case a pivotal spring cam operating means, for selective pivotal movement of the binder rings 120 between closed and open positions.

The third embodiment of the loose leaf binder construction comprising the present invention is illustrated in FIGS. 12 through 19, and in this third embodiment form, the binder rings 220 are somewhat similarly formed, with the upper and lower ring portions 221 and 222, and with these ring portions having the abutting forward ends 223 and 224. In this third embodiment, however, the ring portion rearward ends 225 and 226 are positioned axially offset, one from the other, but preferably axially adjacent and substantially axially aligned when the ring portions 221 and 222 are in closed position, as shown in FIGS. 12, 14 and 16.

Furthermore, the operating arms 227 and 228 rigidly connected to the ring portion rearward ends 225 and 226 extend inwardly within the ring portions 221 and 222 in axially adjacent and aligned positions when the ring portions are in closed positions. The inner ends of these operating arms 227 and 228 are rigidly connected, respectively, to the flat axially extending and edge abutting pivot plates 243 and 244, so that pivot plate 243 extends within its rigidly connected upper ring portion 221 and pivot plate 244 extends within its rigidly connected lower ring portion 222.

As shown in FIG. 16, when the ring portions 221 and 222 are in closed position, the cross sectional configuration of the pivot plates 243 and 244 is generally V-shaped, with the pivot plates extending downwardly from a horizontal plane at preferably approximately 15 degrees. When the ring portions 221 and 222 are in open position, these pivot plates 243 and 244, as shown in FIG. 17, assume an inverted V-shaped cross sectional configuration, preferably extending at approximately 10 degrees from a horizontal plane. Also, as can be seen in FIGS. 16 and 17, when the ring portions 221 and 222 are in closed position, the operating arms 227 and 228 are axially aligned, whereas, when the ring portions are in open position, these operating arms have bypassed each other and are spaced apart at their connections to the ring portion rearward ends 225 and 226.

A resilient control member 245 extends axially telescoped over and extending between the pivot plate axially extending free edges 246 and 247, resiliently urging the pivot plate abutting edges 248 and 249 together and thereby urging the pivot plates downwardly into V-shaped position when the ring portions 221 and 222 are in closed position, as shown in FIG. 16, and urging the pivot plates into inverted V-shaped position when the ring portions are in open position, as shown in FIG. 17. The pivot plate abutting edges 248 and 249 are retained in abutting relationship at all times and prevented from bypassing one another by the oppositely extending tabs 250 on pivot plate 243, and 251 on pivot plate 244, as shown enlarged in FIGS. 18 and 19, as well as in plan view in FIGS. 14 and 15.

In view of the fact that the ring portion forward ends 223 and 224 abut in the closed position of these ring portions, this will limit the downward V-shaped movement of the pivot plates 243 and 244 toward this closed position and therefore, no stop for such movement is required. For movement of the ring portions 221 and 222 to open position, however, axially extending inwardly directed stop shoulders 252 and 253 are formed on the resilient control member 245 overlying the pivot plates 243 and 244, respectively, as best seen in FIGS. 16 and 17, for limiting the upward pivotal movement of the pivot plates into the inverted V-shaped ring portion opening position, such opening position being shown in FIG. 17 with the pivot plates abutting these stop shoulders.

In order to permit the movement of the operating arms 227 and 228 when the ring portions 221 and 222 are moved between the open and closed positions, appropriate cutouts 254 and 255 are formed on the pivot plates 243 and 244, as best seen in FIGS. 12 through 15, and these cutouts with the interfitting control arms also serve to prevent axial movement between the pivot plates, and thereby prevent axial movement between the ring portions, so as to retain each set of ring portions in axially adjacent position. Also, if desired, the tabs 250 and 251 extending from the opposite pivot plates 243 and 244 may be formed axially abutting so as to limit any relative axial movement between the pivot plates.

Thus, with this third embodiment binder construction the line of pivot between the ring portions 221 and 222 is the abutting edges 248 and 249 of the pivot plates 243 and 244. Furthermore, the operating arms 227 and 228 again extend inwardly of the ring portions 221 and 222, with the entire control means for these operating arms, formed by the pivot plates 243 and 244 and the resilient control member 245, being positioned totally within the confines and spaced inwardly from these ring portions 221 and 222.

In this manner leaves (not shown) mounted on the ring portions 221 and 222 may be moved substantially 360 degrees around the binder rings 220 to either side of the operating arms 227 and 228. Furthermore, the ring portion rearward ends 225 and 226 may be formed slightly elliptical to substantially the midpoints of ring portions 221 and 222, in order to provide greater clearance for these leaves beneath and to the side of the pivot plates 243 and 244 and the resilient control member 245.

Finally a cover may be provided for this third embodiment binder construction merely by forming appropriate holes in a flexible cover 256, as shown in FIGS. 16, and slipping this cover over either of the ring portions 221 or 222. In this manner, cover 256 may move around the rings 220 with the leaves contained thereon, or may be folder back with these leaves.

In the foregoing description, certain terms have been used for brevity, clearness and understanding but no unnecessary limitations are to be implied therefrom, because such words are used for descriptive purposes herein and are intended to be broadly construed.

Moreover, the embodiments of the improved construction illustrated and described herein are by way of example and the scope of the present invention is not limited to the exact details of construction shown.

Having now described the invention, the construction, operation and use of preferred embodiments thereof, and the advantageous new and useful results obtained thereby, the new and useful construction and reasonable mechanical equivalents thereof obvious to those skilled in the art are set forth in the appended claims.

I claim:

1. Loose leaf binder construction including a series of axially spaced and axially aligned split binder rings each having upper and lower ring portions, each upper and lower ring portion extending substantially 180 degrees, the upper and lower ring portions each having forward and rearward ends; means pivotally connecting the upper and lower ring portion rearward ends of each ring for movement between a closed position in which the upper and lower ring portion forward ends are abutting and an open position in which the upper and lower ring portion forward ends are spaced apart; operating means totally positioned within the axially defined confines of the rings spaced inwardly of said rings operably connected to the upper and lower ring portions for selectively retaining said ring portions in open position; said operating means including operating arm means having inner ends, said arm means being rigidly connected to the upper and lower ring portion rearward ends and extending inwardly from said ring portion rearward ends to said inner arm means ends, and said arm means being movable between a first position corresponding to the closed position of said upper and lower ring portions and a second position retaining the upper and lower ring portions in open position; said means pivotally connecting the upper and lower ring portions being operably connected to said inner ends of the operating arm means and pivotally connecting said upper and lower ring portions on substantially a common pivot axis; said pivot axis being located at said inner arm means ends and spaced within said ring portions, and said ring portions being totally free of obstruction other than at said ring portion rearward ends and at said operating arm means; the ring portion rearward ends being positioned on substantially a common axial line when said ring portions are in closed position, whereby loose leaves retained on the rings when said rings are in closed position are freely movable from a position at one side of the ring portion rearward ends virtually 360 degrees around said rings to a position at the other side of said rearward ends; said means pivotally connecting the upper and lower ring portions also including axially extending edge abutting pivot plates rigidly connected to said inner ends of said operating arm means; said pivot plates being movable into a V-shaped cross sectional configuration when the ring portions are in closed position and an inverted V-shaped cross sectional configuration when the ring portions are in open position; resilient control means operably connected to the pivot plates resiliently maintaining said pivot plates in said edge abutment at all times; said resilient control means resiliently urging the pivot plates into said V-shaped and inverted V-shaped cross sectional configuration positions when the ring portions are moved to said closed and open positions; the abutment of the ring portion forward ends limiting the movement of the pivot plates into said V-shaped cross sectional configuration position; and stop means on the resilient control means positioned to engage the pivot plates when the pivot plates are moved into said inverted V-shaped cross sectional configuration position limiting the movement of the said plates into said inverted V-shaped position and thereby limiting the movement of the ring portions into open position.

2. Loose leaf binder construction as defined in claim 1 in which the forward ends of the upper and lower ring portions abut and the rearward ends of said ring portions are axially offset and substantially axially aligned when said ring portions are in closed position; and in which the rearward ends of the upper and lower ring portions move out of axial alignment when said ring portions are moved to open position.

References Cited by the Examiner

UNITED STATES PATENTS

| | | | |
|---|---|---|---|
| 986,735 | 3/1911 | McMillan | 129—24 |
| 1,119,786 | 12/1914 | Morden et al. | 129—24 X |
| 1,289,221 | 12/1918 | Mentzer | 129—24 X |
| 1,439,367 | 12/1922 | Krag | 129—24 |
| 2,268,431 | 12/1941 | Slonneger | 129—1 X |
| 2,278,565 | 4/1942 | Schade | 129—1 |
| 2,331,461 | 10/1943 | Dawson et al. | 129—1 |
| 2,504,355 | 4/1950 | Stader | 129—24 X |
| 2,715,906 | 8/1955 | Lucchesi | 129—24 |
| 2,986,173 | 5/1961 | White | 129—24 |

FOREIGN PATENTS

| | | |
|---|---|---|
| 214,375 | 1910 | Germany. |
| 5,791 | 1910 | Great Britain. |

JEROME SCHNALL, *Primary Examiner.*